United States Patent [19]

Traxler et al.

[11] 4,128,263

[45] Dec. 5, 1978

[54] MODIFIED CLAY PAPER COATING

[75] Inventors: James T. Traxler, Evanston; Emil P. Lira, Des Plaines; John F. Kraemer, Chicago, all of Ill.

[73] Assignee: International Minerals & Chemical Corp., Terre Haute, Ind.

[21] Appl. No.: 800,991

[22] Filed: May 26, 1977

Related U.S. Application Data

[62] Division of Ser. No. 558,491, Mar. 14, 1975, Pat. No. 4,038,097.

[51] Int. Cl.$^2$ ............... B32B 9/04; B32B 13/04
[52] U.S. Cl. ............... 282/27.5; 106/288 B; 106/72; 427/150; 427/151; 428/452; 428/464; 428/914; 428/454
[58] Field of Search ............ 428/454, 452, 464, 539, 428/914; 282/27.5; 427/150, 151, 558, 491; 106/288 B, 72

[56] References Cited

U.S. PATENT DOCUMENTS

| | | | |
|---|---|---|---|
| 2,307,239 | 1/1943 | Rowland | 106/288 B |
| 3,915,734 | 10/1975 | Fitton | 106/288 B |
| 3,980,492 | 9/1976 | Thompson | 427/150 |
| 4,038,101 | 7/1977 | Thompson | 427/150 |

*Primary Examiner*—George F. Lesmes
*Assistant Examiner*—E. Rollins Buffalon
*Attorney, Agent, or Firm*—Robert H. Dewey; Howard E. Post

[57] ABSTRACT

A modified clay paper coating composition comprising a montmorillonite clay having at least partially hydrolyzed aluminum chloride bonded thereto is made by treating montmorillonite clay with a non-aqueous solution of anhydrous aluminum chloride following by hydrolyzing with hot water. A paper substrate coated with this composition exhibits improved image light fastness when employed in a pressure-sensitive duplication system.

3 Claims, No Drawings

MODIFIED CLAY PAPER COATING

This is a division of copending application Ser. No. 558,491 filed Mar. 14, 1975 now U.S. Pat. No. 4,038,097.

BACKGROUND OF THE INVENTION

This invention relates to a clay coating composition for use in pressure-sensitive duplication systems and the method for making this composition. The invention further relates to a modified clay-coated sheet for use in pressure-sensitive duplication systems.

The pressure-sensitive duplication systems of the prior art are generally based on the color-forming reaction between an electron-donating colorless compound and an electron-accepting solid substance. Examples of this type of system are described in U.S. Pat. No. 2,712,507 of Green and U.S. Pat. No. 2,730,456 of Green, et al.

In the prior art duplication systems, a number of ways to facilitate the contact of the color-forming reactants have been devised. These systems include (1) a combination of an upper sheet having on its lower surface a layer of microcapsules containing an electron-donating colorless compound (referred to as a color-developing substance) and a lower sheet having on its upper surface a layer of an electron-accepting solid material (referred to as a color-forming substance); (2) a three-sheet combination wherein the intermediate sheet is coated on one surface with the color-developing substance and on the other surface with the color-forming substance; and (3) a single sheet being coated on the same surface with both the color-forming and color-developing substances.

Illustrative of the electron-donating colorless compounds used as color-developing substances in pressure-sensitive duplication systems are malachite green lactone, benzoyl leuco methylene blue, crystal violet lactone, 3-methyl-2, 2'spirobi (benzol [f] - chromene), 3-dialkylamino-7-dialkylamino-flourans, alkyl- or aryl-substituted spiro-dinaphthopyrans and alkyl- or aryl-substituted spiro-dibenzopyrans. Electron-accepting solid substances suitable for use in pressure-sensitive duplication systems as a color-forming substance include active clay, acid clay, bentonite, kaolin, talc, aluminum silicate, aluminum citrate, zinc oxide, titanium oxide, aluminum oxide, arsenic oxide, zinc chloride, aluminum chloride, stannous or stannic chloride, and antimony chloride (see, for example, U.S. Pat. No. 3,442,908 of Orita, et. al.).

Clay compositions are also used generally in the paper industry as fillers and coating compositions for ordinary paper stock. Rowland, U.S. Pat. No. 2,307,239, discloses such a general purpose clay composition which is made by forming a dry mixture of kaolin and a metal salt such as sodium chloride, potassium chloride, aluminum chloride, etc., followed by heating in the range of 785° to 965° C. for between 1 and 5 hours.

While the pressure-sensitive duplication systems of the prior art generally exhibit good image formation, the prior art has failed to provide a system which will remain colorfast upon extended exposure to light.

SUMMARY OF THE INVENTION

It is an object of the present invention to provide a pressure-sensitive duplication sheet which exhibits improved image light fastness when compared with the prior art duplication sheets.

It is a further object of this invention to provide a modified montmorillonite clay coating composition containing hydrolyzed aluminum chloride which results in improved image light fastness in pressure-sensitive duplication systems.

In accordance with this invention there is provided a modified clay paper coating composition for use in pressure-sensitive duplication systems comprising a montmorillonite clay having at least partially hydrolyzed aluminum chloride bonded thereto. The invention further provides for a method of making this composition which comprises treating montmorillonite clay with a non-aqueous solution of anhydrous aluminum chloride to bond the aluminum chloride to the clay and then at least partially hydrolyzing the bonded aluminum chloride. The invention also embraces a modified clay coated sheet for use in pressure-sensitive duplication systems comprising a paper substrate coated with the above described composition, and an improved pressure-sensitive duplication system employing this coated sheet.

DESCRIPTION OF THE INVENTION

The basic raw materials required for the practice of the present invention include clay, aluminum chloride, a non-aqueous solvent, and water.

The clay material can be any of the "montmorillonite" type clays. The preferred clay is sodium bentonite, however, other montmorillonite clays such as those based on calcium or magnesium can be advantageously employed. The clay material can also contain normal quantities of non-clay or non-montmorillonite impurities without adversely affecting the objects of the present invention. The clay should, however, be substantially dry, although minor amounts of residual moisture will not be deleterious to the process. The clay material may be employed in any form which can be easily suspended in a liquid to form a relatively uniform dispersion.

The aluminum chloride employed in the practice of the present invention should be anhydrous aluminum chloride. Any suitable grade of anhydrous aluminum chloride may be used since the presence of minor amounts of impurities will not seriously affect the process of the present invention. This reagent is preferably employed in finely divided powdered form.

The non-aqueous solvent employed in the process of the present invention can be any non-aqueous liquid which meets the following requirements:

(1) The solvent should be aprotic, i.e., one that does not readily give up or accept protons; (2) it should have at least some solvent action on $AlCl_3$; (3) it should be otherwise both chemically and physically non-reactive towards $AlCl_3$; and (4) it should be either volatile or water soluble. Carbon tetrachloride is the preferred example of this solvent, however, other suitable solvents include chloroform, diethyl ether, benzene, nitrobenzene and the like.

According to the preferred process of this invention the montmorillonite clay is first dried and then slurried with a non-aqueous solvent as described above. Sufficient solvent is added to suspend all the clay present. The amount of solvent employed in this step is not critical and it will be readily apparent to one of ordinary skill in the art how much solvent will produce a slurry of workable consistency. It may also be desirable to employ an excess amount of solvent to form the initial suspension and then distill off a portion of the solvent to achieve the desired consistency. This optional distillation step will also remove the last traces of unbound water from the surface of the clay. The slurrying step is preferably performed at room temperature, although elevated temperatures can be employed if desired.

The next step of the process of the present invention is the addition of anhydrous aluminum chloride to the clay slurry described above. This results in the bonding of the entire $AlCl_3$ molecule to the clay. In general the amount of $AlCl_3$ added can be from about 0.01 to about 1.0 moles of $AlCl_3$ per 100 grams of clay, and preferably is from about 0.05 to about 0.2 moles of $AlCl_3$ per 100 grams of clay. Greater amounts may also be used. If the capacity of the clay for bonding $AlCl_3$ is exceeded, the unreacted $AlCl_3$ can be removed in the later described washing step. In order to achieve uniform distribution of the $AlCl_3$ throughout the clay, it is desirable to agitate the mixture. The reaction which results in bonding of the $AlCl_3$ to the clay proceeds rapidly, but as the routineer will appreciate, it may be necessary to allow suitable time for intimate contact of the reactants. Generally contact times of from about 30 minutes to about 10 hours can be employed. The $AlCl_3$ addition can preferably take place at room temperature, although any suitable temperature, for example, in the range of 50° to 100° C. may be employed.

In the next step in the process of the present invention, the above produced slurry is filtered and washed with a non-aqueous solvent, as defined above. Preferably this solvent can be the same one used to originally suspend the clay. The amount of solvent used in the washing step is not critical and is simply that amount necessary to insure adequate contact of the filtered clay solids with the washing solvent. The washing step may be carried out at room temperature or, if desired, at slightly elevated temperature.

The treated and washed clay solids containing bonded $AlCl_3$ are next redispersed in water to form an aqueous slurry. Determination of the amount of water required for this redispersion is well within the skill of the art, as any amount which will form a slurry of workable consistency may be employed. This slurrying step is preferably performed at room temperature although elevated temperatures may be employed if desired.

The aqueous slurry formed in the preceding step is next subjected to a mild heat treatment to promote the hydrolysis of the bonded $AlCl_3$. This heat treatment can be in the range of about 30° C. to about 100° C. In the preferred embodiment the aqueous slurry is warmed over a steam bath. This heating step should generally be continued for a period of from about one to about six hours, however, both the time and the temperature may be varied to achieve the desired amount of hydrolysis. At least 30% and preferably between 60% and 95%, of the bonded $AlCl_3$ is hydrolyzed during this step.

In the final step of the process of the present invention, the treated clay solids are recovered from the aqueous slurry by vacuum filtering and drying. The resulting product is a montmorillonite clay having at least partially hydrolyzed aluminum chloride bonded thereto.

The modified montmorillonite clay composition may be coated by conventional methods onto a paper substrate to form the coated pressure-sensitive duplication sheet of the present invention. When contacted with a conventional color-developing substance, the modified clay coated sheets of the present invention form an image which exhibits greatly improved fade resistance upon exposure to light. The objects of this invention can be achieved by employing any of the well known color-developing substances normally used in conjunction with clay or other electron-accepting substances. Examples of such color-developing substances include malachite green lactone, benzoyl leuco methylene blue, crystal violet lactone, rhodamine B lactam, 3-methyl-2, 2'-spirobi (benzol [f] chromene), 3-dialkylamino-7-dialkylamino-flourans, alkyl- or aryl-substituted spirodinaphthopyrans and alkyl- or aryl-substituted spirodibenzopyrans.

The following examples are included for illustrative purposes only and are not intended to limit the scope of the invention.

EXAMPLE 1

Sodium bentonite (50 grams-E clay dried three hours at 100°–110° C. under vacuum) was slurried with 250 millileters carbon tetrachloride and 75 milliliters solvent was distilled from the mixture. After the mixture had cooled, 6.65 grams (0.05 mole) of aluminum chloride were added with stirring and the mixture was allowed to stand overnight. After stirring one additional hour at room temperature the mixture was filtered and washed with 100 milliliters dry carbon tetrachloride. Evaporation of a small portion of the carbon tetrachloride filtrate yielded only a trace of residue, indicating that the aluminum chloride remained with the bentonite. The treated clay was then slurried with 500 milliliters of water and warmed on a steam bath for about 6 hours. The material was then vacuum filtered and dried.

EXAMPLE 2

A sample of the modified clay coating composition prepared according to Example 1 is applied as a coating to a paper substrate by conventional coating techniques, and fade-resistance tests are performed by incorporating this coated sheet into a standard pressure-sensitive duplication system employing benzoyl leuco methylene blue as a color-developing substance. The image that is formed on the coated paper of the present invention does not reach 50% fade (MacBeth yellow filter) in nearly triple the exposure time taken by the unmodified clay coatings of the prior art.

We claim:

1. A modified clay coated sheet for use in pressure-sensitive duplication systems, said sheet comprising a paper substrate having coated thereon a montmorillonite clay layer, said montmorillonite clay having aluminum chloride bonded thereto, at least 30% of said aluminum chloride being hydrolyzed, whereby the image formed by contacting said coated sheet with a color-developing substance has increased fade resistance upon exposure to light.

2. The modified clay coated sheet of claim 1 wherein said montmorillonite clay is sodium bentonite.

3. In a pressure-sensitive duplication system comprising a sheet of paper coated with a clay-based color-forming substance and a source of a colorless color-developing substance, the improvement comprising providing, as the clay-based color-forming substance, a montmorillonite clay having aluminum chloride bonded thereto, at least 30% of said aluminum chloride being hydrolyzed, whereby the image formed by the reaction of said color-forming substance with said color-developing substance has increased fade resistance upon exposure to light.

* * * * *